United States Patent [19]

Tanaka et al.

[11] Patent Number: 5,656,250
[45] Date of Patent: Aug. 12, 1997

[54] THREE-DIMENSIONAL NETWORK STRUCTURE COMPRISING SPHERICAL SILICA PARTICLES AND METHOD OF PRODUCING SAME

[75] Inventors: Yuko Tanaka, Kawanishi; Muneaki Yamaguchi; Hiromasa Ogawa, both of Ikeda; Katsutoshi Tanaka, Toyonaka, all of Japan

[73] Assignee: Jiro Hiraishi, Director-General, Agency of Industrial Science and Technology, Tokyo-to, Japan

[21] Appl. No.: 495,269

[22] Filed: Jun. 27, 1995

[30] Foreign Application Priority Data

Jun. 27, 1994 [JP] Japan ................................. 6-168711

[51] Int. Cl.$^6$ .......................... C01B 33/12; C04B 38/00
[52] U.S. Cl. ........................... 423/335; 423/336; 501/80; 264/42
[58] Field of Search .................................... 423/335, 336; 501/80; 264/42; 502/232

[56] References Cited

U.S. PATENT DOCUMENTS

| | | | |
|---|---|---|---|
| 3,714,068 | 1/1973 | Miller et al. | 502/232 |
| 4,010,242 | 3/1977 | Iler et al. | 423/335 |
| 4,112,032 | 9/1978 | Blaszyk et al. | 264/42 |
| 4,752,458 | 6/1988 | Robinson | 423/335 |
| 4,849,378 | 7/1989 | Hench et al. | 501/12 |
| 4,888,309 | 12/1989 | Araya | 501/80 |
| 4,902,442 | 2/1990 | Garces | 252/313.2 |
| 4,911,903 | 3/1990 | Unger et al. | 423/335 |
| 5,055,429 | 10/1991 | James et al. | 501/80 |
| 5,354,548 | 10/1994 | Araya et al. | 423/335 |
| 5,384,290 | 1/1995 | Brezny | 501/81 |
| 5,399,535 | 3/1995 | Whitman | 501/80 |

Primary Examiner—Mark L. Bell
Assistant Examiner—Louis M. Troilo
Attorney, Agent, or Firm—Nikaido, Marmelstein, Murray & Oram LLP

[57] ABSTRACT

A three-dimensional network structure comprising three-dimensionally interconnected spherical silica particles, having specific physical characteristics including diameter, pores on the surfaces of the particles, cross-sectional areas of the bonds interconnecting the spherical silica particles, elasticity modulus, voids content, and silica content, the surfaces of the spherical silica particles being wholly or partly covered with a water-soluble polymer, the network structure being able to remain substantially intact when heat-treated and being able to undergo machining. There is also provided a method of making a three-dimensional network structure comprising spherical silica particles, comprising hydrolyzing and polymerizing a low polymer of an alkoxysilane in a mixed solution containing the alkoxysilane low polymer and a water-soluble polymer in a mixed solvent composed of water and an alcohol in the presence of an acid catalyst.

16 Claims, 1 Drawing Sheet

THREE-DIMENSIONAL NETWORK STRUCTURE COMPRISING SPHERICAL SILICA PARTICLES AND METHOD OF PRODUCING SAME

FIELD OF THE INVENTION

The present invention relates to a three-dimensional network structure comprising spherical silica particles and a method of producing the same.

BACKGROUND OF THE INVENTION

Generally, silica particles show high oil absorption and high level filling with said particles is difficult to attain. Accordingly, it is difficult to produce high-fill silica-polymer composite materials and the like. Even when high level filling with silica and the like is possible, the materials obtained have unsatisfactory physical properties, as discussed below, and can hardly be submitted to practical use.

Thus, for example, in the case of silica-polymer composite materials prepared by random closest filling with powdery or flaky quartz glass powder, the maximum fill is 77% by weight. In the case of high silica-filled composite materials having a three-dimensional structure as synthesized from compatible polymer blend systems in a phase separation system utilizing the sol-gel process, the maximum fill is 80% by weight.

Although composite materials prepared from resins or the like with an inorganic material such as silica or glass have an increased rigidity (elasticity) with the increase in fill percentage, they have decreased impact resistance, among others, and are hard and fragile or brittle. As a result, the high silica or like material-filled composite materials mentioned above are thus poor in shock resistance and like properties. Epoxy resin-based composite materials high filled with an inorganic material such as silica or glass, for instance, rapidly lose their rigidity at temperatures above the glass transition point of the resin. They are thus poor in high temperature stability.

SUMMARY OF THE INVENTION

It is a primary object of the present invention to provide a three-dimensional network structure comprising spherical silica particles, which, in spite of its high silica content, shows no tendency toward sudden rigidity fall at temperatures above the glass transition temperature and has good high temperature stability.

The present invention is based on the finding that when a low polymer of an alkoxysilane is subjected to hydrolysis and polymerization in a mixed solution containing the alkoxysilane low polymer and a water-soluble polymer in a mixed solvent composed of water and an alcohol in the presence of an acid catalyst, a new structure having unique physical properties can be obtained.

Thus, the present invention is concerned with the following three-dimensional network structure comprising spherical silica particles and the following method of producing the same.

1. A three-dimensional network structure comprising spherical silica particles which has the following structural and mechanical characteristics:
   (1) It comprises three-dimensionally interconnected spherical silica particles having a diameter of 6 to 30 µm;
   (2) Said spherical silica particles have, on the surface thereof, pores having a radius of 5 to 10 nm and have a specific surface area of 300 to 400 m²/g;
   (3) The cross-sectional area of the bond interconnecting two spherical silica particles is within the range of ½ to ¼ of the maximum cross-sectional area of that particle smaller in maximum cross-sectional area;
   (4) The particle surface of said spherical silica particles is wholly or partly covered with a water-soluble polymer;
   (5) There are mutually communicating voids formed within said network structure and the void content is 40 to 60% on the whole network structure basis;
   (6) The silica content is 60 to 80% by weight on the whole network structure basis;
   (7) When said network structure is heat-treated by keeping in air both at 600° C. for 5 hours and at 800° C. for 3 hours, the network structure substantially remains intact;
   (8) Said network structure can undergo machining and has an elasticity modulus of 1.5 to 2.0 GPa at temperatures below the glass transition temperature and an elasticity modulus of 0.18 to 0.25 GPa at temperatures between the glass transition point and 300° C.

2. A method of producing the three-dimensional network structure comprising spherical silica particles as defined above under 1, which comprises subjecting a low polymer of an alkoxysilane to hydrolysis and polymerization in a mixed solution containing the alkoxysilane low polymer and a water-soluble polymer in a mixed solvent composed of water and an alcohol in the presence of an acid catalyst.

3. A three-dimensional network structure comprising spherical silica particles and having the following structural and mechanical characteristics;
   (1) It comprises three-dimensionally interconnected spherical silica particles having a diameter of 6 to 30 µm;
   (2) Said spherical silica particles have, on the surface thereof, pores having a radius of 5 to 10 nm and have a specific surface area of 300 to 400 m²/g;
   (3) The cross-sectional area of the bond interconnecting two spherical silica particles is within the range of ½ to ¼ of the maximum cross-sectional area of that particle smaller in maximum cross-sectional area;
   (4) There are mutually communicating voids formed within said network structure and the void content is 40 to 60% on the whole network structure basis;
   (5) The silica content is 60 to 80% by weight on the whole network structure basis;
   (6) When said network structure is heat-treated by keeping in air both at 600° C. for 5 hours and at 800° C. for 3 hours, the network structure substantially remains intact;
   (7) Said network structure can undergo machining and has an elasticity modulus of 1.5 to 2.0 GPa at temperatures below the glass transition point and an elasticity modulus of 0.18 to 0.25 GPa at temperatures between the glass transition point and 300° C.

4. A method of producing the three-dimensional network structure comprising spherical silica particles as defined above under 3, which comprises subjecting a low polymer of an alkoxysilane to hydrolysis and polymerization in a mixed solution containing the alkoxysilane low polymer and a water-soluble polymer in a mixed solvent composed of water and an alcohol in the presence of an acid catalyst and then decomposing said water-soluble polymer.

DETAILED DESCRIPTION OF THE INVENTION

Figure 1:
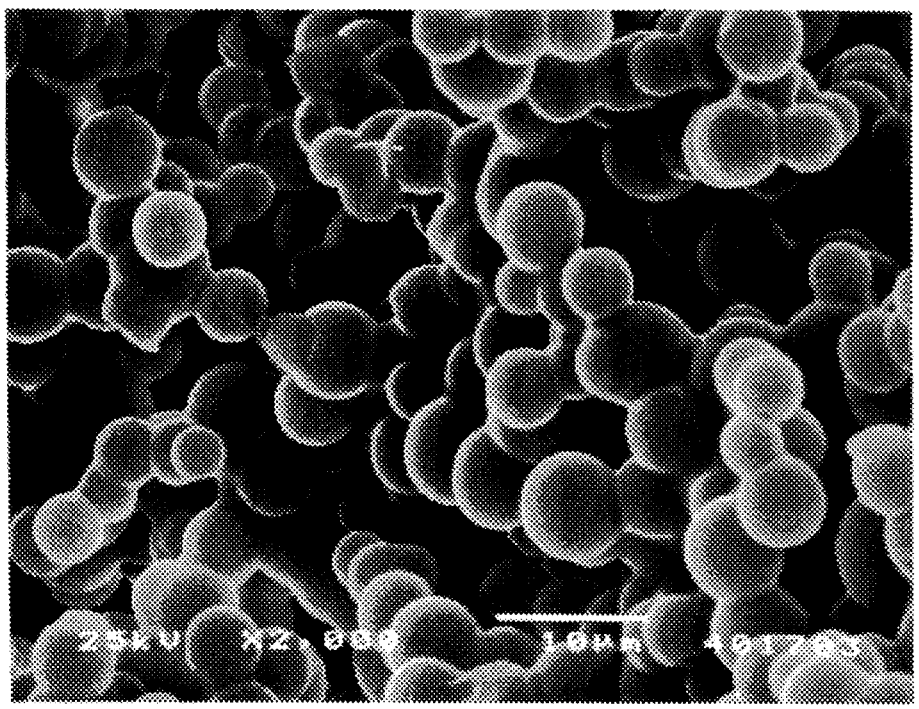
FIG. 1 is a photomicrograph, taken on a scanning electron micrograph (SEM), showing the particle structure of the three-dimensional network structure comprising spherical silica particles as obtained in Example 1.

In the following, the present invention is described in further detail. Unless otherwise stated, the above-mentioned four aspects of the present invention are hereinafter referred to as 1st aspect, 2nd aspect, 3rd aspect and 4th aspect, respectively.

The structure according to the 1st aspect of the present invention has the following characteristic features (1) to (8).

(1) It comprises three-dimensionally inter connected spherical silica particles having a diameter of 6 to 30 μm. The phrase "three-dimensionally inter-connected" means that one spherical silica particle is bound to one or more other spherical silica particles. The spherical silica particles mentioned above are substantially noncrystalline. The diameter is generally about 6 to 30 μm, preferably 10 to 20 μm.

(2) Said spherical silica particles have, on the surface thereof, pores having a radius of 5 to 10 nm and have a specific surface area of 300 to 400 m²/g. The pores existing on the spherical silica particle surface generally have a radius of about 5 to 10 nm, preferably 7 to 8 nm, but there may also be present a certain percentage of pores which have a radius outside the above range provided that the above specific surface area requirement is satisfied.

(3) The cross-sectional area of the bond interconnecting two spherical silica particles is within the range of ½ to ¼ of the maximum cross-sectional area of that particle smaller in maximum cross-sectional area. This means that when one spherical silica particle and one of the plurality of spherical silica particles bound thereto are compared, the bond between the two has a cross-sectional area of ½ to ¼ of the maximum cross-sectional area of the particle smaller in maximum cross-sectional area. Therefore, the bonds among spherical silica particles have the so-called "constricted in the middle" shape. A certain percentage of bonds having a cross-sectional area outside the above range may exist provided that the effects of the invention will not be adversely affected thereby.

(4) The particle surface of said spherical silica particles is wholly or partly covered with a water-soluble polymer. The water-soluble polymer is not limited to any particular species provided that it is soluble in water and compatible with the alcohol used. As examples that have such properties, there may be mentioned, among others, polyacrylic acid, polyethylene glycol, polyvinyl alcohol, polyvinyl acetate, water-soluble proteins, and sodium polystyrenesulfonate. The spherical silica particle surface is wholly or partly covered with such a water-soluble polymer and it is desirable that not less than 90% of said surface should be covered with such polymer.

(5) There are mutually communicating voids formed within said network structure and the void content is 40 to 60% on the whole network structure basis. In the present invention, the phrase "mutually communicating voids" means that individual pores are not independent but three-dimensionally interconnected with one another. The structure may contain closed pores of cells unless they should substantially lessen the effects of the present invention. The above-mentioned void content is generally about 40 to 60% but preferably 45 to 55%.

(6) The silica content is 60 to 80% by weight on the whole network structure basis. Said content is generally about 60 to 80% by weight but preferably 60 to 70% by weight.

(7) When said network structure is heat-treated by keeping in air both at 600° C. for 5 hours and at 800° C. for 3 hours, the network structure substantially remains intact. The phrase "substantially remains intact" means that the heat-treated structure does not show such hardening (embrittlement) resulting in disintegration as shown later herein in comparative examples.

(8) Said network structure can undergo machining and has an elasticity modulus of 1.5 to 2.0 GPa at temperatures below the glass transition point and an elasticity modulus of 0.18 to 0.25 GPa at temperatures between the glass transition point and 300° C. Said machining includes, among others, cutting and shaping.

The 2nd aspect of the present invention is concerned with the above-mentioned method of producing the above structure which comprises subjecting a low polymer of an alkoxysilane to hydrolysis and polymerization in a mixed solution containing the alkoxy-silane low polymer and a water-soluble polymer in a mixed solvent composed of water and an alcohol in the presence of an acid catalyst.

The mechanisms of formation of the above structure in the said method of the present invention are as follows. Simultaneously with the above polymerization reaction, phase separation occurs in the metastable region, whereby nucleation for silica particles begins. In the course of the growth of silica particles, the system goes into the unstable region (spinodal decomposition region), where the silica particle growth is accompanied by interparticle bonding. As a result, a three-dimensional network structure comprising spherical silica particles is formed.

In this connection, Nakanishi and his colleagues report, in the *Journal of Non-Crystalline Solids*, 139 (1992) pp. 1–13, that they obtained entangled silica structures by gelating a homogeneous solution composed of tetraethoxysilane monomer or tetramethoxysilane monomer, polyacrylic acid, water, methanol or ethanol, and nitric acid at 60° C. to thereby cause phase separation into a silica phase and a polymer phase within the unstable region defined by the spinodal curve, and then washing away the polymer phase. On the contrary, the structure formation according to the present invention is effected while controlling the change in solvent concentration so that the system shifts into the unstable region after a certain extent of spherical silica particle growth in the metastable region where nucleation and growth occur. The method of the present invention is essentially different from the method mentioned above which starts with an alkoxysilane monomer.

The monomer to serve as the alkoxysilane low polymer is not limited to any particular species but includes, among others, monomers having an alkoxy group containing 1 to 4 carbon atoms, such as tetramethoxy-silane and tetraethoxysilane. Suited for use as said low polymer are those resulting from polymerization of generally about 4 to 10 molecules of such a monomer. The low polymer may be any per se known one or a commercially available one.

The water-soluble polymer is not limited to any particular species provided that it is compatible with the alcohol to be used. As examples, there may be mentioned polyacrylic acid, polyethylene glycol, polyvinyl alcohol, polyvinyl acetate, water-soluble proteins, and sodium polystyrenesulfonate, etc. These may be used either alone or in combination. The water-soluble polymer may be used in the form of an aqueous solution prepared prior to mixing.

As a result of the presence of the water-soluble polymer in the reaction system according to the method of the present invention, the reactions proceed according to the following mechanisms. Thus, as the polymerization reaction of the alkoxysilane low polymer proceeds in the compatible system comprising the alkoxysilane low polymer and water-soluble polymer, the compatibility between the polymerization product and water-soluble polymer decreases and said system enters the two-phase region (phase separation region), whereupon the same components begin to gather respectively and phase separation starts. In this process, an entangled structure (three-dimensional interpenetrating structure) is formed. Therefore, it is possible, by immobilizing the system at this stage by gel formation, to obtain a desired three-dimensional network structure. The three-dimensional network structure varies depending on the stage of phase separation at which said gel formation occurs. Therefore, the physical properties (molecular weight, viscosity, etc.) of the water-soluble polymer and the amount thereof have great influences on the properties of the three-dimensional network structure formed in accordance with the present invention.

When the water-soluble solvent is absent in the reaction system or the content thereof is too small, disintegrated silica fragments alone are formed, failing to form the desired three-dimensional network structure. On the other hand, when the water-soluble polymer content is excessive, a mass composed of a swollen body of the water-soluble polymer and fine silica particles dispersed therein is formed.

As regards the proportions of said low polymer and water-soluble polymer, it is recommendable to use generally about 10 to 40 parts by weight, preferably 25 to 35 parts by weight, of the water-soluble polymer per 100 parts by weight of the alkoxy-silane low polymer. When the proportion of the water-soluble polymer is too small, any three-dimensional network structure comprising mutually interconnected spherical silica particles will not be formed. In that case, more particularly, a state is attained in which the water-soluble polymer is found dispersed in spherical form in silica glass. Upon drying, the glass is disintegrated into small pieces, giving granules about 1 to 2 mm in size. On the other hand, when the water-soluble polymer is used in an excessively large proportion, a state results in which silica particles are dispersed in the water-soluble polymer, hence any desired structure can not be obtained.

The alcohol to be used in the water-alcohol mixed solvent is not limited to any particular species provided that it can serve as the solvent. Thus, for example, lower alcohols containing 1 to 4 carbon atoms, such as methyl alcohol, ethyl alcohol, propyl alcohol, isopropyl alcohol and butyl alcohol, can suitable be used.

The proportions of water and the alcohol are generally 40 to 60% by weight of water and 60 to 40% by weight of alcohol, preferably 53 to 57% by weight of alcohol and 47 to 43% by weight of alcohol. When the water-soluble polymer is used in the form of an aqueous solution, the amount of water in said aqueous solution should be included in calculating the proportion of water in said mixed solvent.

The concentration of the solids comprising the alkoxysilane low polymer and water-soluble polymer in said mixed solvent is generally about 40 to 60% by weight but preferably 42 to 46% by weight.

As the acid catalyst, there may be mentioned inorganic acids such as hydrochloric acid, nitric acid and sulfuric acid as well as organic acids such as acetic acid, oxalic acid and formic acid. Among these, hydrochloric acid, nitric acid and acetic acid are preferred. The acid catalyst is used generally in an amount of about 0.5 to 2% by weight, preferably 1 to 1.2% by weight, based on the whole reaction system components.

The order of mixing of these alkoxysilane low polymer, water-soluble polymer, water-alcohol mixed solvent and catalyst is arbitrary provided that uniform mixing of these can be assured. Thus, for example, these may be mixed up all at once, or the alcohol may be added to the alkoxysilane low polymer, followed by admixing with an aqueous solution of the water-soluble polymer and further by addition of the acid catalyst. The water-alcohol mixed solvent may be prepared in situ by adding water and the alcohol separately.

The structure of the present invention can be produced by mixing these components uniformly, with stirring as necessary, and then allowing the mixture to stand for maturation or aging. The aging temperature is generally about 20° to 25° C. The aging period is generally about 10 to 35 days but may be shorter or longer depending on the starting material species, aging temperature and other conditions.

Furthermore, the above structure may be partly deprived of the water-soluble polymer covering the spherical silica particles in said structure, as desired, by washing with water, for instance.

The water-soluble polymer covering the spherical silica particles occurring in the structure can be wholly removed by subjecting said structure, after solidification thereof and with or without washing with water or a like treatment, to heat treatment at a temperature above the decomposition point of the water-soluble polymer (4th aspect). The heat treatment temperature to be employed may vary depending on said decomposition point (i.e. water-soluble polymer species) but is generally about 500° C. or higher. This heat treatment gives the structure according to the 3rd aspect of the present invention.

The production method in the 2nd aspect of the present invention can provide the three-dimensional network structure (1st aspect) comprising spherical silica particles and having a new structure and unique physical properties.

Said three-dimensional network structure, which comprises spherical silica particles, shows a rigidity lower than those of epoxy resins at temperatures below the glass transition point in spite of its high silica content and, furthermore, has flexibility, hence can be bent or subjected to machining such as cutting or shaping.

Furthermore, the structure mentioned above shows no abrupt rigidity fall even in a high temperature region and can retain its practical rigidity eve at temperatures where organic materials melt or decompose. In the table given below, the ordinary temperature and high temperature elasticity modulus and high temperature stability data for an example of the three-dimensional network structure of the present invention (1st aspect) and a cured epoxy resin structure (bisphenol F type epoxy resin cured with himic anhydride) are shown for comparison.

|  | Invention | Epoxy resin |
| --- | --- | --- |
| Ordinary temperature elasticity modulus | 1.5 GPa | 3.0 GPa |
| High temperature elasticity modulus (above glass transition point) | 0.18 GPa | 0.019 GPa |
| High temperature stability | Stable at 300° C. | Destructed at 250° C. |

The structure of the present invention which has such characteristics is useful as a carrier for oxygen immobilization, for instance, through utilization of the pores on spherical silica particles and the water-soluble polymer-derived functional groups (carboxyl groups, hydroxyl groups, etc.). When a functional polymer capable of selective separation of substances is immobilized in the structure, it can be used as a heat-resistant, high strength separation membrane capable of high-performance separation function in such fields as chemical, pharmaceutical and medical industries. It is further useful, in producing intelligent materials, as a basic material to be composited with intelligent polymers.

EXAMPLES

The following examples and comparative examples illustrate the characteristic features of the present invention. The parts and percentage used in the examples are all by weight.

EXAMPLE 1

A tetramethoxysilane low polymer (trademark "MS 51"; product of Mitsubishi Chemical; polymerization degree n=4; 14 parts) was blended, at 25° C., with 10 parts of special grade ethyl alcohol and 16 parts of a 25% aqueous solution of polyacrylic acid (viscosity at 30° C.: 8000–12000 cps), then 0.5 part of 36% hydrochloric acid was added, and the mixture was stirred for 10 minutes and then allowed to stand at 25° C. for allowing the hydrolysis and polymerization reactions to proceed. After about 2 weeks of standing, the reaction mixture solidified to give a block-like matter.

The thus-obtained three-dimensional network structure comprising spherical silica particles had the following physical properties.
(1) It comprises three-dimensionally interconnected spherical silica particles having a diameter of 6 to 8 μm;
(2) Said spherical silica particles have, on the surface thereof, pores having a radius of 5 to 7 nm and have a specific surface area of 320 to 350 m$^2$/g;
(3) The cross-sectional area of the bond interconnecting two spherical silica particles is within the range of ⅓ to ¼ of the maximum cross-sectional area of that particle smaller in maximum cross-sectional area;
(4) The particle surface of said spherical silica particles is about 98% covered with polyacrylic acid;
(5) There are mutually communicating voids formed within said network structure and the void content is about 44% on the whole network structure basis;
(6) The silica content is 65% by weight on the whole network structure basis;
(7) When said network structure is heat-treated by keeping in air both at 600° C. for 5 hours and at 800° C. for 3 hours, the network structure substantially remains intact;
(8) Said network structure can undergo machining such as shaping and has an elasticity modulus of 1.75 GPa at ordinary temperature (25° C.) and an elasticity modulus of 0.18 to 0.25 GPa at temperatures between the glass transition point and 300° C.

This structure was examined under a scanning electron microscope. The result is illustrated in FIG. 1.

EXAMPLE 2

A tetramethoxysilane low polymer (trademark "MS 51"; product of Mitsubishi Chemical: 18 parts) was blended, at 18° C., with 10 parts of special grade ethyl alcohol and 16 parts of a 25% aqueous solution of polyacrylic acid (viscosity at 30° C.: 8000–12000 cps), then 0.5 part of 36% hydrochloric acid was added, and the mixture was stirred for 10 minutes and then allowed to stand at 18° C. for allowing the hydrolysis and polymerization reactions to proceed. After about 3 weeks of standing, the reaction mixture solidified to give a block-like matter.

The product occurred as a three-dimensional network structure comprising silica spheres of uniform particle size (about 10 μm). When heat-treated by keeping in air at 600° C. for 5 hours or at 800° C. for 3 hours, this network structure substantially retained the above network structure.

EXAMPLE 3

A tetramethoxysilane low polymer (trademark MS 51; product of Mitsubishi Chemical; 19 parts) was blended, at 18° C., with 10 parts of special grade ethyl alcohol and 16 parts of a 25% aqueous solution of polyacrylic acid (viscosity at 30° C.: 8000–12000 cps), then 0.5 part of 36% hydrochloric acid was added, and the mixture was stirred for 10 minutes and then allowed to stand at 18° C. for allowing the hydrolysis and polymerization reactions to proceed. After about 3 weeks of standing, the reaction mixture solidified to give a block-like matter.

The product occurred as a three-dimensional network structure comprising silica spheres with a particle size of about 10 to 30 μm.

EXAMPLE 4

A tetramethoxysilane low polymer (trademark "MS 56"; product of Mitsubishi Chemical; polymerization degree n=8; 35 parts) was blended, at 25° C., with 25 parts of special grade methyl alcohol, 20 parts of polyethylene glycol (polymerization degree n=400) and 30 parts of distilled water, then 1 part of 36% hydrochloric acid was added, and the mixture was stirred for 10 minutes and then allowed to stand at 25° C. for allowing the hydrolysis and polymerization reactions to proceed. After about 2 weeks of standing, the reaction mixture solidified to give a block-like matter.

The product occurred as a three-dimensional network structure comprising silica spheres with a particle size of about 10 to 20 μm.

EXAMPLE 5

A tetraethoxysilane low polymer (polymerization degree n=5; 15 parts) was blended, at 25° C., with 25 parts of special grade methyl alcohol and 16 parts of a 25% aqueous solution of polyacrylic acid, then 0.5 part nitric acid was added, and the mixture was stirred for 10 minutes and then allowed to stand at 23° C. for aging. After about 15 days, the reaction mixture solidified to give a block-like matter.

The product occurred as a three-dimensional network structure comprising silica spheres with a particle size of about 15 to 25 μm.

EXAMPLE 6

A tetraethoxysilane low polymer (polymerization degree n=7; 15 parts) was blended, at 18° C., with 10 parts of special grade ethyl alcohol, 18 parts of polyethylene glycol (polymerization degree n=200) and 15 parts of distilled water, then 2 parts of acetic acid was added, and the mixture was stirred for 15 minutes and then allowed to stand at 18° C. for allowing the hydrolysis and polymerization reactions to proceed. After about 30 days, the reaction mixture solidified to give a block-like matter. The product occurred as a three-dimensional network structure comprising spherical silica particles.

Comparative Example 1

A tetramethoxysilane low polymer (trademark "MS 51"; product of Mitsubishi Chemical; polymerization degree n=4; 29 parts) was blended, at 25° C., with 15 parts of special grade ethyl alcohol and 6 parts of distilled water, then 1 part of 36% hydrochloric acid was added, and the mixture was stirred for 10 minutes and then allowed to stand at 25° C. for allowing the reactions to proceed. After about 5 hours of standing, the reaction mixture solidified and disintegrated to give small transparent silica fragments (about 1 to 2 mm in size).

Comparative Example 2

The procedure of Comparative Example 1 was followed except that 29 parts of another tetramethoxysilane low polymer (trademark "MS 56"; product of Mitsubishi Chemical; polymerization degree n=8) was used. The product obtained occurred as small transparent silica fragments as in Comparative Example 1.

Comparative Example 3

A tetramethoxysilane low polymer (trademark "MS 51"; product of Mitsubishi Chemical; polymerization degree n=4; 29 parts) was blended, at 25° C., with 15 parts of special grade ethyl alcohol and 4 parts of a 25% aqueous solution of polyacrylic acid (viscosity at 30° C.: 8000–12000 cps) and 6 parts of water, then 1 par of 36% hydrochloric acid was added, and the mixture was stirred for 10 minutes and then allowed to stand at 25° C. for allowing the reactions to proceed. After about 3 hours of standing, the reaction mixture solidified and disintegrated to give small, yellow, opaque silica fragments (about 1 to 2 mm in size).

What is claimed is:

1. A three-dimensional network structure comprising three-dimensionally interconnected spherical silica particles, said silica particles generally having a diameter of 6 to 30 µm;

said spherical silica particles having pores on the surfaces thereof, said pores having a radius of 5 to 10 nm, said spherical silica particles having a specific surface area of 300 to 400 m$^2$/g;

substantially each pair of interconnected silica particles having a cross-sectional area of the bond interconnecting said pair of spherical silica particles within the range of ½ to ¼ of the maximum cross-sectional area of that particle of said pair which is smaller in maximum cross-sectional area;

said surfaces of said spherical silica particles being wholly or partly covered with a water-soluble polymer;

mutually communicating voids being present within said network structure, said network structure having a void content of 40 to 60% on the whole network structure basis;

said network structure having a silica content of 60 to 80% by weight on the whole network structure basis;

said network structure being able to remain substantially intact if heat-treated by keeping in air both at 600° C. for 5 hours and at 800° C. for 3 hours;

said network structure being able to undergo machining and having an elasticity modulus of 1.5 to 2.0 GPa at temperatures below the glass transition temperature and an elasticity modulus of 0.18 to 0.25 GPa at temperatures between the glass transition point and 300° C.

2. A method of producing a three-dimensional network structure comprising spherical silica particles, comprising hydrolyzing and polymerizing a low polymer of an alkoxysilane in a mixed solution containing said alkoxysilane low polymer and a water-soluble polymer in a mixed solvent composed of water and an alcohol in the presence of an acid catalyst.

3. A production method as claimed in claim 2, wherein the alkoxysilane low polymer is a product of polymerization of 4 to 10 molecules of corresponding monomer, each monomer having an alkoxy group and 1 to 4 carbon atoms.

4. A production method as claimed in claim 2, wherein the water-soluble polymer is at least one member of the group consisting of polyacrylic acid, polyethylene glycol, polyvinyl alcohol, polyvinyl acetate, water-soluble proteins and sodium polystyrenesulfonate.

5. A production method as claimed in claim 2, wherein the proportions of the alkoxysilane low polymer and water-soluble polymer are such that the water-soluble polymer amounts to 10 to 40 parts by weight per 100 parts by weight of the alkoxysilane low polymer.

6. A production method as claimed in claim 2, wherein the alcohol in the water-alcohol mixed solvent is an alcohol containing 1 to 4 carbon atoms.

7. A production method as claimed in claim 2, wherein the concentration of the alcohol in the water-alcohol mixed solvent is 40 to 60% by weight.

8. A production method as claimed in claim 2, wherein the acid catalyst is at least one member of the group consisting of hydrochloric acid, nitric acid, sulfuric acid, acetic acid, oxalic acid and formic acid.

9. A three-dimensional network structure comprising three-dimensionally interconnected spherical silica particles, said silica particles generally having a diameter of 6 to 30 µm;

said spherical silica particles having pores on the surfaces thereof, said pores having a radius of 5 to 10 nm, said spherical silica particles having a specific surface area of 300 to 400 m$^2$/g;

substantially each pair of interconnected silica particles having a cross-sectional area of the bond interconnecting said pair of spherical silica particles within the range of ½ to ¼ of the maximum cross-sectional area of that particle of said pair which is smaller in maximum cross-sectional area;

mutually communicating voids being present within said network structure, said network structure having a void content of 40 to 60% on the whole network structure basis;

said network structure having a silica content of 60 to 80% by weight on the whole network structure basis;

said network structure being able to remain substantially intact if heat-treated by keeping in air both at 600° C. for 5 hours and at 800° C. for 3 hours;

said network structure being able to undergo machining and having an elasticity modulus of 1.5 to 2.0 GPa at temperatures below the glass transition temperature and an elasticity modulus of 0.18 to 0.25 GPa at temperatures between the glass transition point and 300° C.

10. A method of producing a three-dimensional network structure comprising spherical silica particles, comprising hydrolyzing and polymerizing a low polymer of an alkoxysilane in a mixed solution containing said alkoxysilane low polymer and a water-soluble polymer in a mixed solvent composed of water and an alcohol in the presence of an acid catalyst.

11. A production method as claimed in claim 10, wherein the alkoxysilane low polymer is a product of polymerization of 4 to 10 molecules of corresponding monomer, each monomer having an alkoxy group and 1 to 4 carbon atoms.

12. A production method as claimed in claim 10, wherein the water-soluble polymer is at least one member of the group consisting of polyacrylic acid, polyethylene glycol, polyvinyl alcohol, polyvinyl acetate, water-soluble proteins and sodium polystyrenesulfonate.

13. A production method as claimed in claim 10, wherein the proportions of the alkoxysilane low polymer and water-soluble polymer are such that the water-soluble polymer amounts to 10 to 40 parts by weight per 100 parts by weight of the alkoxysilane low polymer.

14. A production method as claimed in claim 10, wherein the alcohol in the water-alcohol mixed solvent is an alcohol containing 1 to 4 carbon atoms.

15. A production method as claimed in claim 10, wherein the concentration of the alcohol in the water-alcohol mixed solvent is 40 to 60% by weight.

16. A production method as claimed in claim 10, wherein the acid catalyst is at least one member of the group consisting of hydrochloric acid, nitric acid, sulfuric acid, acetic acid, oxalic acid and formic acid.

* * * * *